No. 848,797. PATENTED APR. 2, 1907.
R. S. ALLAN.
MACHINE FOR GROOVING WOOD.
APPLICATION FILED AUG. 17, 1904.
2 SHEETS—SHEET 2.
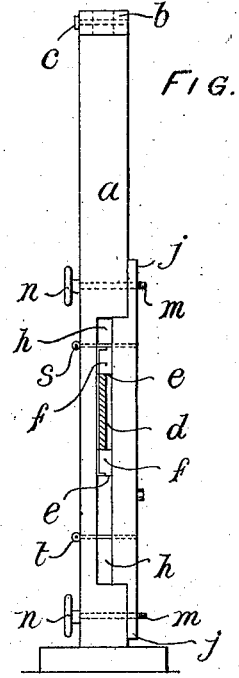
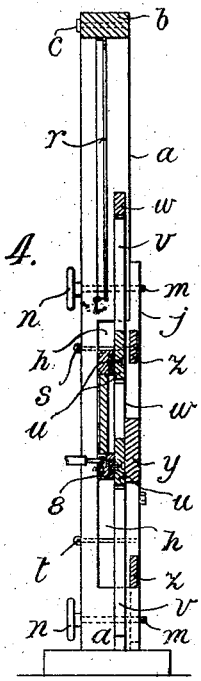
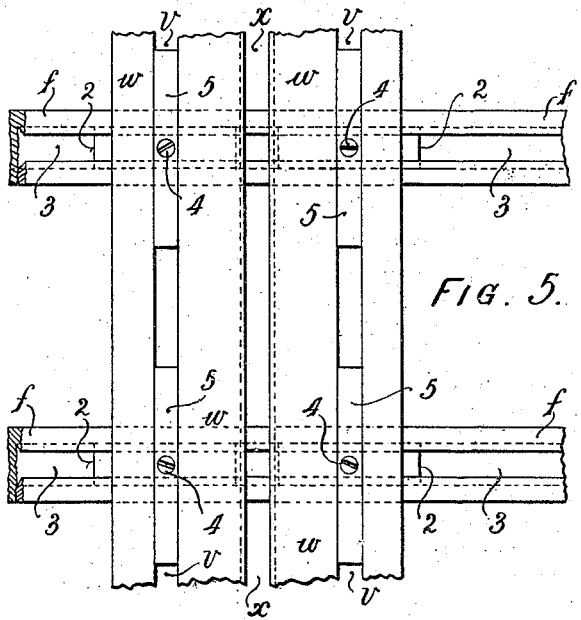
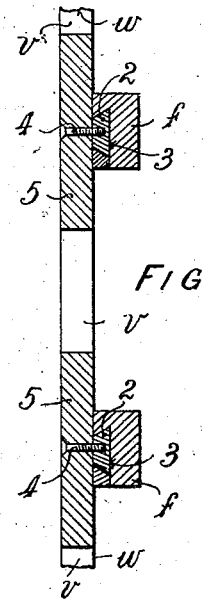
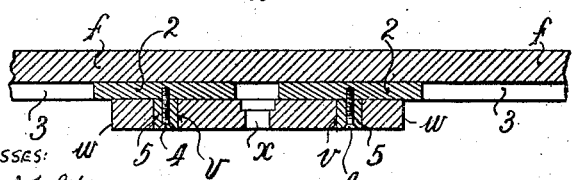
INVENTOR
Robert Stamp Allan

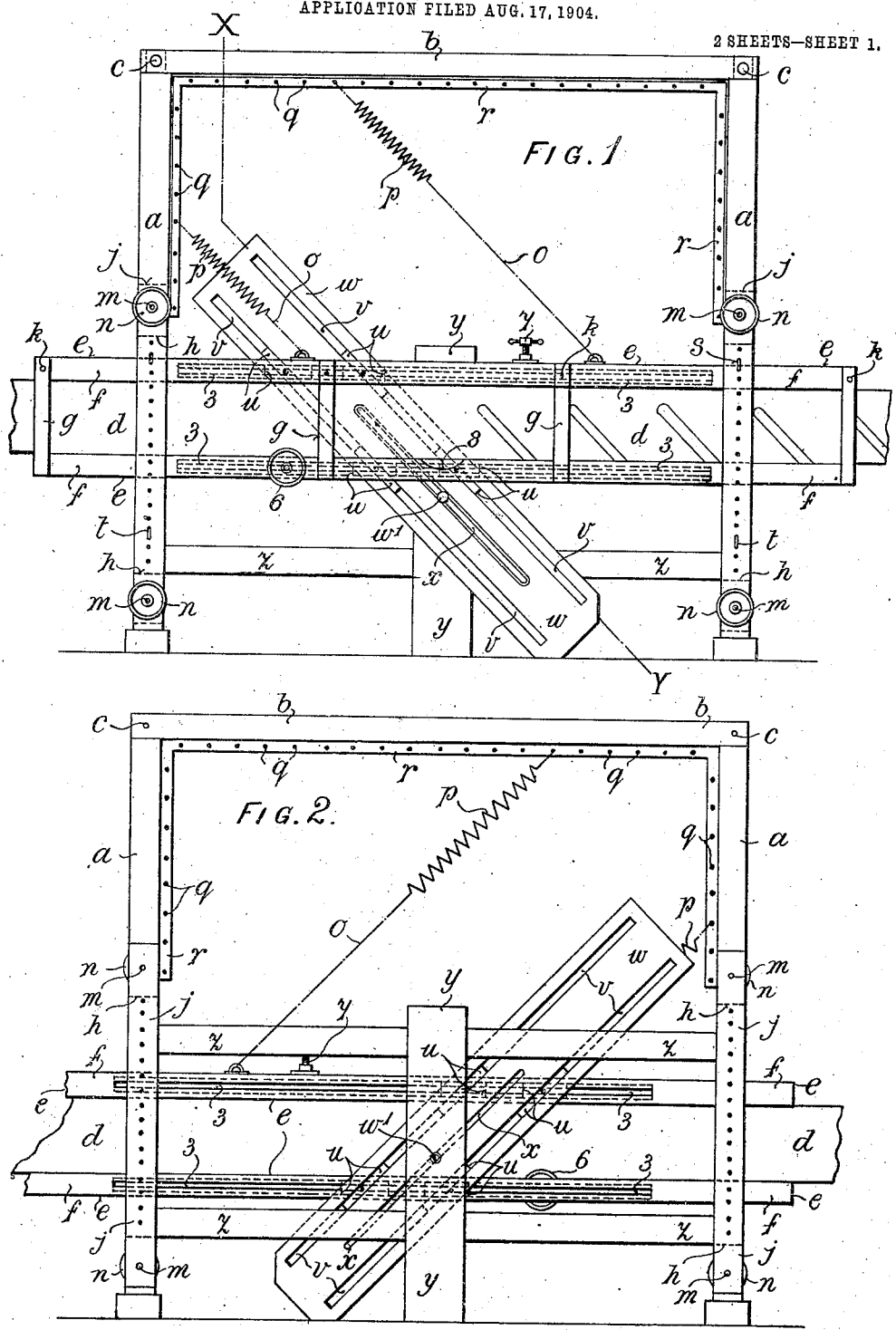

UNITED STATES PATENT OFFICE.

ROBERT STAMP ALLAN, OF DURHAM, ENGLAND.

MACHINE FOR GROOVING WOOD.

No. 848,797.  Specification of Letters Patent.  Patented April 2, 1907.

Application filed August 17, 1904. Serial No. 221,052.

*To all whom it may concern:*

Be it known that I, ROBERT STAMP ALLAN, a subject of the King of Great Britain and Ireland, and a resident of Gateshead, Durham, England, have invented certain new and useful Improvements in or Relating to Machines for Grooving or Trenching Wood, of which the following is a specification.

This invention relates to a machine for grooving or trenching wood, and has for its object to provide a machine adapted for use as a separate apparatus or for fitting temporarily or permanently to any machine having a cutting-tool adapted for the work required.

According to my invention I employ a work-carrying frame adapted to be reciprocated upon or in a suitable frame and to have freedom of movement transversely to the reciprocating motion, an adjustable fixed guide or guides adapted to lie at any angle with the reciprocating frame and to have its angle altered without altering the angle at which the work-carrying frame lies, the said reciprocating frame and guide being so connected that as the reciprocating frame is traveled its freedom of lateral movement will cause it to follow the angle at which the guide is set, and so cause a groove of corresponding angle to be cut in the work carried by the reciprocating frame.

I further provide means whereby springs or weights or the means by which the work-carrying frame or table is returned to its initial position can be so arranged or adjusted as to exert their pull at or about in alinement with or parallel to the line in which the frame or table carrying the work travels.

I will describe one form of my invention in reference to the accompanying drawings, wherein—

Figure 1 is a front elevation, Fig. 2 a rear elevation, Fig. 3 an end elevation, and Fig. 4 a sectional end elevation, on the line X Y in Fig. 1. Fig. 5 is a part enlarged rear elevation; and Figs. 6 and 7 are respectively sectional plan and sectional end elevation of same.

Referring to the drawings, according to the way illustrated of carrying my invention into effect I employ a main framing composed of side members $a\ a$ and a top member $b$, preferably connected together by pins or bolts $c\ c$, so that they can be taken apart and stored to economize space when the machine is not in use, and the board $d$ to be operated upon is carried by a reciprocating frame $e$, composed of bars or members $f\ f$, secured together by ties or straps $g\ g$ and disposed and working within slots or recesses or other suitable guides $h\ h$ in or on the side members $a\ a$ and secured therein by retaining pieces or members $j\ j$, but having free lateral movement. The reciprocating frame $e$ may be adjusted to take various widths of boards by removing the ties or straps $g\ g$ and substituting longer or shorter ties or straps, as may be required, or for this purpose the upper ends of the ties or straps $g\ g$ may be extended and provided with slots through which the securing-screws or the like $k\ k$ pass. The retaining members $j\ j$ may be adjusted by screwed rods $m\ m$ and hand-wheels $n\ n$ to permit boards of various thicknesses to be carried by the reciprocating frame $e$.

The reciprocating frame $e$ may be suspended within the slots $h\ h$ in any suitable manner; but I prefer to adopt the arrangement shown in the drawings, wherein the frame $e$ is suspended by cords or chains $o\ o$ and springs $p\ p$ from holes $q\ q$ in flanges or angle-bars $r\ r$, secured to the side members $a\ a$ and top member $b$. In arranging the apparatus horizontally the springs or weights might be dispensed with, if desired, and in this case the reciprocating frame $e$ would be returned by hand. Pins or the like $s\ s$ and $t\ t$, adapted to be inserted in holes in the side members $a\ a$, and retaining members $j\ j$ are provided for regulating the vertical travel of the frame $e$.

At the back the reciprocating frame is furnished with adjustable guides $u\ u$, adapted to coact with slots $v\ v$ in an adjustable guide $w$, secured at the desired angle at which the grooves or "chases" are required to be cut by a bolt or the like $w'$, passing through a slot $x$ to the fixed member $y$, which is connected by bars $z\ z$ to the retaining members $j\ j$. As shown best in Figs. 5, 6, and 7, the guides $u\ u$ may conveniently be constituted by blocks 2 2, sliding in dovetail recesses 3 3 in the bars or members $f f$ of the reciprocating frame $e$ and having pivotally attached to them by screws or the like 4 4 blocks 5 5, adapted to project into and engage the slots $v\ v$ in the adjustable guide $w$. The blocks 2 2 are adapted after adjustment of the guide $w$ to be clamped by the screws 4 or otherwise to the bars $ff$ of the frame $e$ to prevent movement of the frame $e$ in any other than the desired direction. If the friction between the parts is sufficient, the screws need not be adjusted.

The board $d$ may be moved along in the frame $e$ and roughly adjusted by hand, and the final adjustment may be effected by a hand-wheel 6, having on its spindle a milled feed-wheel disposed in a recess in the lower bar $f$ of the frame and engaging the lower edge of the board, and when the latter has been properly adjusted it may be secured by a clamping screw or screws 7.

For cutting grooves or chases I employ a revolving circular cutter (shown in Fig. 4) which projects into a recess 8 in the lower member $f$ of the reciprocating frame $e$ and commences to cut at the lower edge of the board $d$. The cutter may be fitted to the horizontal spindle of any adjacent machine or otherwise suitably mounted; but it forms no part of my invention.

The operation of a machine constructed as above described is as follows: The board to be grooved or "chimed" is inserted in the reciprocating frame $e$, adjusted and secured therein, the guide $w$ is set to the angle at which it is desired to cut the grooves or chases, as shown at Fig. 1, and, if desired, the blocks 2 2 are clamped to the bars $ff$ of the frame $e$. The reciprocating frame $e$ is then pressed downward by the operator, and the guide-blocks 5 5 of the guides $u$ $u$, coacting with the slots $v$ $v$ in the guide $w$, cause the frame by reason of its lateral freedom to travel in a correspondingly angular direction and the cutter to cut a similarly-inclined groove or "chase" in the board until the frame $e$ comes against the adjustable pins $t$ $t$. The operator then releases the frame $e$, and the springs $p$ $p$ raise it clear again, and the board is adjusted by moving it along in the frame $e$ for the next cut, and the operations are repeated.

It will now be readily seen that by my invention grooves or chases may be cut in the faces of wooden boards at any desired angle to the edge by merely setting the fixed guide $w$ to the required angle. In determining the angle at which a groove is to be cut it is only necessary to adjust the guide $w$, the work requiring no adjustment except as to the position where the cut is to start.

The spring $p$ $p$ may be secured to any of the holes $q$ $q$ in the angle-bars $r$ $r$, so that the pull exerted by them will always be in a direct line with or parallel to the travel of the movable frame $e$.

An important advantage of this invention lies in the fact that it may be made as a separate and complete machine adapted to be fitted temporarily or permanently to any machine having a cutter or tool adapted for the work required.

What I claim, and desire to secure by Letters Patent, is—

1. In a machine for grooving or trenching wood and the like, the combination of a routing-cutter, a work-carrying frame mounted so as to be freely movable in any direction in the plane in which it lies, an adjustable guiding means mounted independently of said frame and adapted to be adjusted at various angles, and means connecting said guide to said frame and adapted to constrain said frame to move only in a direction corresponding to the position of said guide.

2. In a machine for grooving or trenching wood and the like, the combination of a routing-cutter, a work-carrying frame mounted so as to be freely movable in any direction in the plane in which it lies, and an adjustable guiding means adapted to constrain said frame to move only in a predetermined direction and to be adjusted to alter the direction of movement of the frame, said guiding means comprising an angularly-adjustable member having elongated grooves and mounted independently of said frame, and guide-blocks adapted to slide in said grooves and pivotally connected to guide-blocks carried by said frame.

3. In a machine for grooving or trenching wood and the like, the combination of a routing-cutter, a stationary frame, a movable work-carrying frame mounted in said stationary frame and freely movable in any direction in the plane in which it lies, a guide member carried by said stationary frame and adapted to be adjusted at various angles thereto, and means connecting said guide member to said movable frame whereby the latter is constrained to move only in a direction corresponding to the position of said guide member.

4. In a machine for grooving or trenching wood and the like, the combination of a routing-cutter, a stationary frame, a movable work-carrying frame mounted in said stationary frame and freely movable in any direction in the plane in which it lies, an angularly-adjustable guide member carried by said stationary frame and adapted to be adjusted at various angles thereto, and means connecting said guide member to said movable frame whereby the latter is constrained to move only in a direction corresponding to the position of said guide member, said means comprising guide-blocks adapted to slide in elongated grooves in said guide member and pivotally connected to guide-blocks carried by said movable frame.

5. In a machine for grooving or trenching wood and the like, the combination of a routing-cutter, a work-carrying frame mounted so as to be freely movable in any direction in the plane in which it lies, an adjustable guide for said frame mounted independently thereof and adapted to be adjusted at various angles, and means connecting said frame to said guide whereby said frame is constrained to move only in a direction corresponding to said guide and said guide can be adjusted to alter the direction of the movement of said frame to vary the cut without alteration of the angle at which said frame or the work lies.

6. In a machine for grooving or trenching wood and the like, the combination of a routing-cutter, a stationary frame, a movable work-carrying frame mounted in said stationary frame, and freely movable in any direction in the plane in which it lies, a guide carried by said stationary frame and adapted to be adjusted at various angles thereto, said guide and said movable frame having elongated grooves on their opposing faces and members sliding in the respective grooves and pivoted to each other whereby said movable frame and guide may be adjusted angularly to each other and said movable frame is constrained to travel only in a direction corresponding to the position of said guide.

7. In a machine for grooving or trenching wood and the like, the combination of a routing-cutter, a work-carrying frame mounted so as to be freely movable in any direction in the plane in which it lies, an adjustable guiding means mounted independently of said frame and connected thereto and adapted to be adjusted to alter the direction of the travel of said frame whereby to vary the angle of the cut and to constrain said frame to move only in a direction corresponding to the position of said guide, and means for restoring said frame to its original position, said means being adjustable in accordance with the variations of movement of said frame.

8. In a machine for grooving or trenching wood and the like, the combination of a work-carrying frame mounted so as to be freely movable in any direction in the plane in which it lies, an adjustable guiding means mounted independently of said frame and connected thereto and adapted to be adjusted to alter the direction of the travel of said frame whereby to vary the angle of the cut and to constrain said frame to move only in a direction corresponding to the position of said guide, and means for restoring said frame to its original position, said means being adjustable in accordance with the variations of movement of said frame and comprising a spring having one end attached to said frame and means adapted to support the other at different positions.

9. In a machine for grooving or trenching wood and the like, the combination of a fixed part, a work-carrying frame mounted so as to be freely movable in any direction in the plane in which it lies, said fixed part and said frame having interengaging guiding means adapted to constrain said frame to move in a predetermined path, such guiding means being adjustable to vary the angle of the path in which such frame moves.

10. In a machine for grooving or trenching wood and the like, the combination of a fixed part, a work-carrying frame mounted so as to be freely movable in any direction in the plane in which it lies, said fixed part and said frame having interengaging guiding means adapted to constrain said frame to move in a predetermined path, such guiding means being adjustable to vary the angle of the path in which such frame moves, and comprising an angularly-adjustable member having elongated grooves and mounted independently of said frame, and guide-blocks adapted to slide in said grooves and pivotally connected to guide-blocks carried by said frame.

11. A machine for grooving or trenching wood or the like, the combination of a fixed part, a work-carrying frame, mounted so as to be freely movable in any direction in the plane in which it lies, said fixed part and said frame having interengaging guiding means adapted to constrain said frame to move in a predetermined path, such guiding means being adjustable to vary the angle of the path in which such frame moves, and comprising an angularly-adjustable guide member carried by said fixed part, and adapted to be adjusted at various angles thereto, and means connecting said guide member to said work-carrying frame whereby the latter can move only in a direction corresponding to the position of said guide member, said means comprising guide-blocks adapted to slide in elongated grooves in said guide member and pivotally connected to guide-blocks carried by said frame.

12. In a machine for grooving or trenching wood and the like, the combination of a fixed part, a work-carrying frame mounted so as to be freely movable in any direction in the plane in which it lies, said fixed part and said frame having interengaging guiding means adapted to constrain said frame to move in a predetermined path, such guiding means being adjustable to vary the angle of the path in which such frame moves, and comprising a guide having elongated grooves facing similar grooves formed in said frame and members sliding in the respective grooves and pivoted to each other whereby said frame and guide may be adjusted angularly to each other and said frame can travel only in a direction corresponding to the position of said guide.

13. In a machine for grooving or trenching wood and the like, the combination of a fixed part, a work-carrying frame mounted so as to be freely movable in any direction in the plane in which it lies, said fixed part and said frame having interengaging guiding means adapted to constrain said frame to move in a predetermined path, such guiding means being adjustable to vary the angle of the path in which such frame moves, and means for restoring the guide to its original position after its movements.

14. In a machine for grooving or trenching wood and the like, the combination of a fixed part, a work-carrying frame mounted so as to be freely movable in any direction in the plane in which it lies, said fixed part and said frame having interengaging guiding means adapted to constrain said frame to move in a predetermined path, such guiding means being adjustable to vary the angle of the path in which such frame moves, and means for restoring the guide to its original position after its movements, such means being adjustable in accordance with the angle of movement of the frame.

In witness whereof I have hereunto signed my name in the presence of two subscribing witnesses.

ROBERT STAMP ALLAN.

Witnesses:
 EDMUND WARD PATTISON,
 HERBERT HOWARD.